United States Patent

Harrison et al.

Patent Number: 5,306,419
Date of Patent: Apr. 26, 1994

[54] USED LUBRICATING OIL RECLAIMING

[75] Inventors: Charles W. Harrison; Arthur G. Gorneau; Robert M. Steinberg, all of Houston, Tex.; Bruce R. Bond, Carmel, N.Y.

[73] Assignee: Texaco Inc., White Plains, N.Y.

[21] Appl. No.: 102,365

[22] Filed: Aug. 5, 1993

[51] Int. Cl.$^5$ .................. C10M 175/00; C10G 7/00; B01D 3/00

[52] U.S. Cl. ................................. 208/179; 208/18; 208/184; 208/365; 208/368

[58] Field of Search .............. 208/179, 184, 365, 368, 208/18

[56] References Cited

U.S. PATENT DOCUMENTS 2,319,750  5/1943  Schonberg et al. ............. 208/356
4,333,822  6/1982  Tkac et al. ..................... 208/184
4,381,992  5/1983  Wood et al. .................... 208/179

Primary Examiner—R. Bruce Breneman
Assistant Examiner—Patricia L. Hailey
Attorney, Agent, or Firm—James L. Bailey; Kenneth R. Priem; Richard A. Morgan

[57] ABSTRACT

A used lubricating oil comprising lube oil additives, including zinc dithiophosphate is subjected to reclaiming. Zinc dithiophosphate is thermally decomposed at a temperature of 400° F. (204° C.) to 1000° F. (538° C.) for a residence time of 10 to 120 minutes. The resulting oil is subjected to vacuum distillation. A zinc-free (i.e. ash free by ASTM D-482) distillate oil is useful as marine diesel fuel. About 5 to 25 vol % is recovered as a metal containing bottoms product, useful as asphalt extender. The process is carried out in the absence of chemical demetallizing.

15 Claims, 1 Drawing Sheet

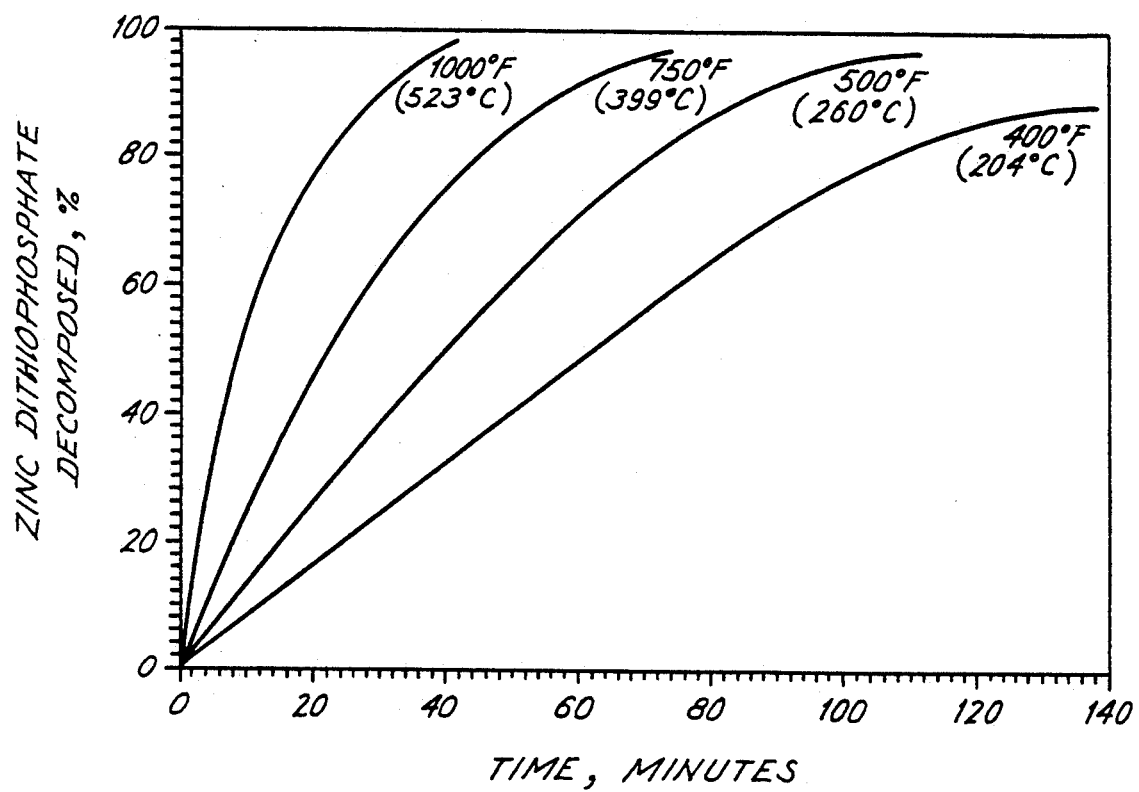

USED LUBRICATING OIL RECLAIMING

BACKGROUND OF THE INVENTION

1. Field of the Invention

This invention relates to a process for reclaiming used lubricating oil. More particularly this invention relates to reclaiming used lubricating oil containing organometallic additives to produce a metal-free distillate oil.

2. Description of the Prior Art

Automotive lubricating oils are one product of crude petroleum. Typically, these oils are made by fractionation, refining and dewaxing to yield the lubricating oil. Alternatively, a narrower boiling range lubricating oil, termed synthetic oil, is produced from the polymerization of petroleum derived monomers.

Most lubricating oils are derived from waxy petroleum distillate oils. Such waxy petroleum distillate oils have a viscosity of less than 50 SUS at 100° F. and have a boiling range of about 600° F. to 650° F. (315° C. to 343° C.) to about 1050° F. to 1100° F. (566° C. to 593° C). Such waxy petroleum distillate oils may be derived from raw lube oils the major portion of which boil above 650° F. (343° C). These raw lube oils are vacuum distilled with overhead and side draw-offs and a bottom stream referred to as residual oil. Considerable overlap in boiling ranges between distillates and the residual oil may exist depending upon distillation efficiency. Some heavier distillates have almost the same distribution of molecular species as the residual oil. Both paraffinic and naphthenic crude oils are used as sources of lube oils with paraffinic crudes giving the best yields of high viscosity index product, hence these are preferred for most lubricating oils.

Such distillates contain aromatic and polar compounds which are undesirable in lubricating oils. These compounds are removed by means such as solvent extraction, hydrogenation and other means well known in the art, either before or after dewaxing.

The wax content of a waxy distillate oil is defined by the amount of material removed to produce a dewaxed oil with a selected pour point temperature in the range of about +25° F. to −40° F. (−3.9° C. to −40° C.). Wax content of waxy distillate oil can vary in the range of 5 wt % to 50 wt %. Distillate oil is dewaxed by solvent dewaxing or catalytic dewaxing processes. The dewaxed product is referred to as a lubricating oil base stock and is suitable for blending with other base stocks to achieve a desired viscosity.

Synthetic base lubricating oils may include poly-α-olefin oils, ester (diester and polyester oils), polyalkylene glycol oils or mixtures having a kinematic viscosity of 4 cSt to 50 cSt at 100° C., typically 4 cSt to 30 cSt at 100° C. These synthetic base oils are inherently free of sulfur, phosphorus and metals.

Poly-α-olefin oils are prepared by the oligomerization of 1-decene or other lower olefin to produce high viscosity index lubricant range hydrocarbons in the $C_{20}$ to $C_{60}$ range. Other lower olefin polymers include polypropylene, polybutylene, propylene-butylene copolymers, chlorinated polybutylene, poly(1-hexene), poly(1-octene), alkylbenzene (e.g., dodecylbenzene, tetradecylbenzene, dinonylbenzene, di(2-ethylhexyl)benzene); polyphenyl (e.g. biphenyls, terphenyls, alkylated polyphenols) and alkylated diphenyl ethers and alkylated diphenyl sulfides and the derivatives, analogs and homologs thereof.

Polyalkylene glycol oils are prepared by polymerization of alkylene oxide polymers and interpolymers and derivatives wherein the terminal hydroxyl groups have been modified by esterification, etherification, etc. Examples include polyoxyalkylene polymers prepared by polymerization of ethylene oxide or propylene oxide, the alkyl and aryl ethers of these polyoxyalkylene polymers (e.g. methyl-polyisopropylene glycol ether having an average molecular weight of 1000, diphenyl ether of polyethylene glycol having a molecular weight of 500 to 1000, diethyl ether of polypropylene glycol having a molecular weight of 1000 to 1500); and mono- and polycarboxylic esters thereof, for example, the acetic acid esters, mixed $C_3$ to $C_8$ fatty acid esters and $C_{13}$ oxo acid diester of tetraethylene glycol.

The lubricating oil, from the fractional distillation of petroleum or from polymerization, is combined with additives such as soaps, extreme pressure (E.P.) agents, viscosity index (V.I.) improvers, antifoamants, rust inhibitors, antiwear agents, antioxidants, and polymeric dispersants to produce an engine lubricating oil of SAE 5 to SAE 60 viscosity.

After use, this oil is collected from truck and bus fleets and automobile service stations for reclaiming. This collected oil is grade SAE 5 to SAE 60 and will contain organo-metallic additives such as zinc dithiophosphate from the original lubricating oil formulation and sludge formed in the engine. However, when the collection is not supervised by the processor the used oil may typically contain waste grease, brake fluid, transmission oil, transformer oil, railroad lubricant, antifreeze, dry cleaning fluid, degreasing solvent, edible fats and oils, water, and waste of unknown origin referred to broadly as undesirable components. Used lubricating oil can contain all of these components.

At its present state of development waste oil reclaiming is carried out by small processors each of which uses a different process, responsive to the waste oil available, product demand and environmental considerations in the geographic area. All these different processes include as a minimum chemical demetallizing or distillation. Reclaiming processes all suffer from a common defect, i.e., difficulty in processing waste oil containing zinc dithiophosphate. Zinc dithiophosphate containing oils become sticky on heating, rendering the oil difficult to process. Successful reclaiming processes require the reduction of zinc dithiophosphate to a concentration of 0.001 wt % or less at which concentration the hot oil is no longer sticky. To accomplish this, chemical demetallizing processes are used. These include the reaction of a cation phosphate or cation sulfate with the chemically bonded metal to form metallic phosphate or metallic sulfate. These metallic compounds are removed as a bottoms product of unit operations such as settling, decanting, filtering and distilling.

There exists a need in the art for a reclaiming process which significantly reduces the organometallic content of a waste oil without chemical treatment. Organometallic content is often referred to in the art as ash content, measured by ASTM D-482.

SUMMARY OF THE INVENTION

The invention is a process for reclaiming used lubricating oil containing organometallic compounds, including zinc dithiophosphate in a concentration of 0.01 to 5.0 wt %. The used lubricating oil is heated to an additive decomposition temperature of about 400° F. (204° C.) to 1000° F. (523° C.) and maintained at the additive decomposition temperature for a residence time in the range of 10 to 120 minutes. As a result, the zinc dithiophosphate concentration is reduced to 0.001 wt % or less. This is accomplished in the absence of any other demetallizing such as chemical demetallizing.

BRIEF DESCRIPTION OF THE DRAWING

The drawing is a graph of the thermal decomposition of zinc dithiophosphate in used lubricating oil with respect to time.

DESCRIPTION OF THE PREFERRED EMBODIMENTS

The invention is a process for reclaiming a used lubricating oil drained from the crankcase of gasoline, diesel or natural gas powered internal combustion engines. This used lubricating oil will have been formulated from paraffin based petroleum distillate oils or from synthetic base lubricating oils. Unavoidably, used lubricating oil contains amounts of water and other hydrocarbon liquids.

The used lubricating oil of the invention is primarily characterized in containing organometallic compounds which are known in the art as lubricating oil additives. The additive of primary concern is zinc dithiophosphate. Other organometallic compounds include: barium sulfonate, magnesium sulfonate, sodium sulfonate, alkyl-substituted calcium salicylates and boric acid complexes. Lithium, potassium and sodium soaps of greases may also be included.

Used lubricating oil is distinguished from other waste oil in containing 0.01 to 5.0 wt % zinc dithiophosphate. Zinc dithiophosphate is a common lubricating oil additive used for its wear resistance and load carrying capacity, thermostability and oxidation stability, providing the properties in an amount of 0.01 to 5.0 wt %, preferably 0.1 to 2.0 wt %, typically 0.2 to 1.0 wt %.

Zinc dithiophosphate is a term of art referring to zinc dialkyldithiophosphate. Some examples of zinc dithiophosphate include zinc dialkyldithiophosphates, such as:

zinc di-n-propyldithiophosphate,
zinc diisopropyldithiophosphate,
zinc di-n-butyldithiophosphate,
zinc diisobutyldithiophosphate,
zinc di-sec-butyldithiophosphate,
zinc di-n-amyldithiophosphate,
zinc diisoamyldithiophosphate,
zinc di-n-hexyldithiophosphate,
zinc di-sec-hexyldithiophosphate,
zinc bis(2-ethylhexyl)dithiophosphate, and
zinc didecyldithiophosphate,
zinc diaryldithiophosphates, such as
zinc diphenyldithiophosphate, and
zinc bis(alkylaryl)dithiophosphates, such as
zinc bis(nonylphenyl)dithiophosphates, and
zinc bis(dodecylphenyl)dithiophosphates.

Oil reclaiming processes comprises heating the oil to a temperature of 70° F. (21° C.) or higher for fractional distillation. Used lubricating oils are particularly difficult to reclaim because they contain organometallic compounds, particularly zinc dithiophosphate. Zinc dithiophosphate becomes sticky in lubricating oil when it is heated to distillation temperatures. stickiness increases with increasing temperature. Used lubricating oil containing 0.01 to 5.0 wt % zinc dithiophosphate is particularly difficult to reclaim because the stickiness is disruptive of the reclaiming process. The zinc dithiophosphate coats surfaces, such as heat exchange surfaces. In particular, furnace tubes are coated, forming large amounts of carbonaceous deposits which disrupts the process.

Applicants have found that a used lubricating oil can be demetallized by thermal treatment alone. In particular, zinc dithiophosphate can be decomposed by maintaining the compound at a temperature of 400° F. (204° C.) to 1000° F. (523° C.), preferably 500° F. (260° C.) to 750° F. (399° C.) for a residence time of 10 minutes to 120 minutes. The resulting decomposition product is not sticky.

Reference is made to the Drawing. The graph depicts decomposition of zinc dithiophosphate in used lubricating oil with respect to time. The graph was constructed by plotting residence time in minutes on the abscissa and zinc dithiophosphate concentration on the ordinate for each of four additive decomposition temperatures labeled on the graph 1000° F. (523° C.); 750° F. (399° C.); 500° F. (260° C.); and 400° F. (240° C.). The curves were constructed from Inventors' accumulated experience in demetallizing used lubricating oil in petroleum refineries.

The graph shows that zinc dithiophosphate can be reduced from a concentration of 0.01 to 5.0 wt % to a concentration of 0.001 wt % or less by heating the oil to a decomposition temperature of 400° F. (204° C.) to 1000° F. (523° C.) for 10 minutes to 120 minutes. Preferably, the decomposition temperature is 500° F. (260° C.) to 750° F. (399° C.).

Because the zinc dithiophosphate in oil becomes sticky on heating, it is desirable to first heat the oil by direct heat exchange with hot oil. This is carried out by admixing used lubricating oil with heated, additive-attenuated product oil to form an admixture. The ratio of used lubricating oil to heated product oil depends upon the temperatures of the two oils. Advantageous results are achieved with the used lubricating oil at an atmospheric temperature, i.e. 32° F. (0° C.) to 120° F. (49° C.), and the heated product oil at 400° F. (204° C.) to 1000° F. (523° C.). The heated product oil is derived from the process. Product oil is heated by indirect heat exchange in the tubes of a fired furnace. This can be carried out without excess formation of carbonaceous deposits because the product oil comprising 0.001 wt % or less zinc dithiophosphate does not adhere to the furnace tubes.

Two methods have been found for forming the admixture. In a first method, the used lubricating oil is admixed with the preexisting admixture during its residence time at the additive decomposition temperature. This is achieved by means of a lance, discharging into the bulk preexisting admixture to form additional admixture. Admixing by this method is achieved at a used lubricating oil:preexisting admixture volumetric ratio of 1:10 to 1:120, preferably 1:20 to 1:70. In the second method the used lubricating oil is admixed with heated product oil at the furnace tube discharge. This is carried out in a transfer line between the furnace tube outlet and the vessel providing additive decomposition residence time. Admixing is carried out in the transfer line at a used lubricating oil:heated product oil volumetric ratio of about 1:1 to 1:4, preferably 1:2 to 1:3.

It has been discovered in accordance with the invention that the first heat exchange by direct heat exchange, followed by a second heat exchange by indirect heat exchange is the Best Mode for carrying out the invention. Apparatus for carrying out the additive degradation and vacuum distillation is a matter of choice. It has been discovered that the entire process can be carried out in a single vacuum distillation column having sufficient volumetric capacity below the first tray to provide a residence time in the range of 10 to 120 minutes.

The first direct heat exchange is carried out in the reservoir below the first tray of the column. The second indirect heat exchange is carried out in the tubes of the fired furnace or steam reboiler associated with the vacuum distillation column.

The resulting oil is then vacuum distilled at a vacuum distillation temperature of 400° F. (204° C.) to 1050° F. (565° C.) and a distillation pressure of 20 to 500 mm Hg (0.03 to 0.66 atm) to yield distillate hydrocarbon oil and an asphaltic bottoms product. Preferably the distillation temperature is 500° F. (260° C.) to 750° F. (399° C.) and the distillation pressure is 50 to 150 mm Hg (0.06 to 0.20 atm). The amount of distillate hydrocarbon oil varies, depending on the quality of the used lubricating oil. Typically about 75 to 95 vol% of the used lubricating oil is recovered as a distillate hydrocarbon oil comprising 0.001 wt % or less zinc dithiophosphate. The asphaltic bottoms product accounts for the remaining 5 to 25 volt of the used lubricating oil. This bottoms product comprises zinc dithiophosphate degradation products and other metallic residues. These metals may be quantified as ash according to ASTM D-482.

The distillate hydrocarbon oil may be recovered as a single product. Typically, in the vacuum distillation unit operation the distillate will be fractionated to produce several distillate fractions, e.g. two fractions. The first is a fuel gas quality light hydrocarbon fraction boiling below about 70° F. (21° C.). The fraction may be used as is. More typically it is subjected to amine scrubbing to remove residual acidic compounds before blending into fuel gas.

The second fraction is a liquid distillate oil. The initial boiling point of this second fraction is 70° F. (21° C.), the end point is 1100° F. (593° C.). In one embodiment this fraction may be used directly for marine diesel fuel, No. 2 fuel oil or No. 6 fuel oil. In another embodiment it may be fractionated again to yield naphtha, gasoline, kerosene, gas oil and vacuum gas oil.

In general, marine diesel fuel has a maximum kinematic viscosity of 14.0 cSt at 40° C., a minimum cetane number of 35 and a maximum sulfur of 2 wt %. No. 2 fuel oil has a 33° A.P.I. gravity and maximum sulfur of 0.5 wt %. No. 6 fuel oil has a 15.5° A.P.I. gravity and no sulfur specification.

In general, both gasoline and naphtha have a boiling range of 30° F./−1.1° C. (C4) to 360° F. (182° C). Kerosene has a boiling range of 360° F. (182° C.) to 530° F. (276° C.). Diesel has a boiling range of 360° F. (182° C.) to about 650°–680° F. (343°C.–360° C.). The end point for diesel is 650° F. (343° C.) in the United States and 680° F. (360° C.) in Europe. Gas oil has an initial boiling point of about 650°–680° F. (343°C. −360° C.) and end point of about 800° F. (426° C). The end point for gas oil is selected in view of process economics and product demand and is generally in the 750° F. (399° C.) to 800° F. (426° C.) range with 750° F. (399° C.) to 775° F. (412° C.) being most typical. Vacuum gas oil has an initial boiling point of 750° F. (399° C.) to 800° F. (426° C.) and an end point of 950° F. (510° C.) to 1100° F. (593° C.). The end point is defined by the hydrocarbon component distribution in the fraction as determined by ASTM D-86 or D-1160 distillation.

The bottoms product of vacuum distillation is a vacuum residuum fraction boiling at 1100° F. (593° C.) and above. This fraction contains essentially all of the metals from the feedstock. The bottoms product may be used as: fuel oil, asphalt extender, feedstock for delayed coking, feedstock for a partial oxidation or for cement kiln fuel where the metal would remain in the product cement.

This invention is shown by way of Example.

EXAMPLE

The process was simulated on digital computer.

Used crankcase oil is subjected to flash separation at 300° F. (148.8° C.) and 35 psig (2.38 atm) to remove water. About 6 vol % is removed as steam and light hydrocarbon.

The remaining dry oil contains over 1000 ppm in metals, derived from lube oil additives and over 100 ppm in zinc, from zinc dithiophosphate. The dry oil is passed directly to the lower portion of a vacuum fractionator where it is heated by direct heat exchange mixing with hot oil in a volumetric ratio of dry oil:hot oil of 1:45. The vacuum fractionator lower portion has sufficient capacity to provide an average residence time of 45 minutes. A bottoms pump provides circulation to a fired heater which maintains a constant flash zone temperature of 660° F. (348.8° C.). Heat exchange in the fired heater is by indirect heat exchange, the furnace tube wall providing heat transfer medium between the fire box and oil.

Vacuum fractionation is typically carried out at a pressure of 50 to 150 mm Hg (0.06 to 0.20 atm). A minor overhead product is withdrawn comprising steam, fuel gas and chlorinated solvents from dry cleaning fluid and degreasing solvent. A major side stream distillate product is withdrawn. The distillate product is free of zinc according to ASTM D-482. It has an initial boiling point of 70° F. (21° C.), an end point of 1100° F. (593° C.) and a midpoint of 750° F. (399° C.). This distillate product is blended as is into marine diesel.

A bottom product is withdrawn comprising 5 to 25 vol of the dry oil. This bottoms product contains over 1000 ppm metals by ASTM D-482 including all of the zinc from the dry oil.

While particular embodiments of the invention have been described, it will be understood, of course, that the invention is not limited thereto since many modifications may be made, and it is, therefore, contemplated to cover by the appended claims any such modification as fall within the true spirit and scope of the invention. For example used lubricating oils containing zinc dithiophosphate concentrations of greater than 5.0 wt % are contemplated as being susceptible to the process. Greater amounts of zinc dithiophosphate are known to improve wear resistance but at the present time are not cost effective and therefore not found in used lubricating oil.

What is claimed is:

1. A process for reclaiming used lubricating oil comprising organometallic compounds including zinc dithiophosphate in a concentration of 0.01 to 5.0 wt %, comprising:

heating the used lubricating oil to an additive decomposition temperature of about 400° F. (204° C.) to 1000° F. (523° C.), and maintaining the additive decomposition temperature for a residence time in the range of 10 to 120 minutes, thereby reducing the zinc dithiophosphate concentration to 0.001 wt % or less in the absence of chemical demetallizing.

2. A process for reclaiming used lubricating oil having a zinc dithiophosphate concentration of 0.01 to 2.0 wt %, comprising the steps of:
 (a) maintaining the used lubricating oil at an additive decomposition temperature of about 400° F. (204° C.) to 1000° F. (538° C.) for a residence time in the range of about 10 to 120 minutes;
 (b) vacuum distilling at a distillation temperature of 400° F. (204° C.) to 1050° F. (565° C.) and a distillation pressure of 20 to 500 mm Hg,
 (c) recovering a distillate product comprising 0.001 wt % or less zinc dithiophosphate, and an asphaltic bottoms product comprising zinc containing degradation products.

3. The process of claim 2 wherein the distillation pressure is 50 to 150 mm Hg.

4. The process of claim 2 wherein the distillation temperature is about 500° F. (260° C.) to 750° F. (399° C.).

5. The process of claim 2 carried out as a continuous process.

6. A process for reclaiming used lubricating oil comprising organometallic compounds including zinc dithiophosphate in a concentration of 0.01 to 5.0 wt %, comprising:
 (a) heating the used lubricating oil by means of direct heat exchange by admixing with a heated product oil to form an admixture, said heated product oil at an additive decomposition temperature of about 400° F. (204° C.) to 1000° F. (523° C.),
 (b) maintaining the admixture at the additive decomposition temperature for a residence time in the range of 10 to 120 minutes, thereby reducing the zinc dithiophosphate concentration to 0.001 wt % or less to form a product oil, and
 (c) heating the product oil to a temperature of 400° F. (204° C.) to 1000° F. (523° C.) by means of indirect heat exchange to yield the heated product oil.

7. The process of claim 6 wherein in step (a) the used lubricating oil is heated from an initial temperature of 32° F. (0° C.) to 120° F. (49° C.).

8. The process of claim 6 wherein in step (a) the volumetric ratio of used lubricating oil:heated product oil is 1:1 to 1:120.

9. A process for reclaiming used lubricating oil having a zinc dithiophosphate concentration of 0.01 to 5.0 wt %, comprising the steps of:
 (a) heating the used lubricating oil by direct heat exchange by means of admixing with a heated product oil at an additive decomposition temperature of about 400° F. (204° C.) to 1000° F. (538° C.) and maintaining a residence time in the range of about 10 to 120 minutes to yield a product oil comprising 0.001 wt % or less zinc dithiophosphate;
 (b) heating the product oil by means of indirect heat exchange to the additive decomposition temperature of 400° F. (204° C.) to 1000° F. (538° C.) to produce the heated product oil.
 (c) vacuum distilling the heated product oil at a distillation temperature of 400° F. (204° C.) to 1050° F. (565° C.) and a distillation pressure of 20 to 500 mm Hg, and
 (d) recovering a distillate product comprising 0.001 wt % or less zinc dithiophosphate, and an asphaltic bottoms product comprising zinc containing degradation products.

10. The process of claim 9 wherein the distillation pressure is 50 to 150 mm Hg.

11. The process of claim 9 wherein the distillation temperature is about 500° F. (260° C.) to 750° F. (399° C).

12. The process of claim 9 carried out as a continuous process.

13. The process of claim 9 wherein in step (a) the used lubricating oil is heated from an initial temperature of 32° F. (0° C.) to 120° F. (49° C.).

14. The process of claim 9 wherein in step (a) the volumetric ratio of used lubricating oil:heated product oil is 1:1 to 1:120.

15. The process for claim 9 additionally comprising: admixing the distillate product with a liquid fuel selected from the group consisting of marine diesel fuel, naphtha, gasoline, kerosene, No. 2 fuel oil, No. 6 fuel oil and mixtures thereof.

* * * * *